W. TASSIN, DEC'D.
H. E. GASCH, ADMINISTRATOR.
PRIMARY CELL.
APPLICATION FILED JUNE 19, 1914.
1,196,611.
Patented Aug. 29, 1916.
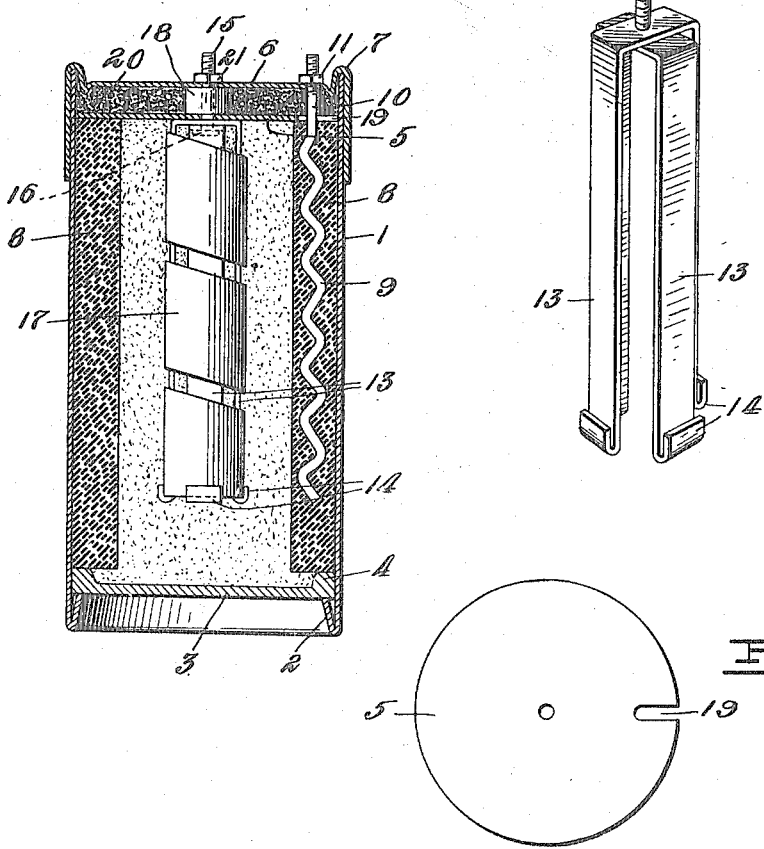
Witnesses
H. B. Robnette
George McDaniel
Inventor
Wirt Tassin
By K. P. McElroy
Attorney

UNITED STATES PATENT OFFICE.

WIRT TASSIN, OF WASHINGTON, DISTRICT OF COLUMBIA; HERMAN E. GASCH, ADMINISTRATOR OF SAID TASSIN, DECEASED, ASSIGNOR TO KINETIC ELECTRIC COMPANY, OF NORFOLK, VIRGINIA, A CORPORATION OF VIRGINIA.

PRIMARY CELL.

1,196,611.          Specification of Letters Patent.      Patented Aug. 29, 1916.

Application filed June 19, 1914. Serial No. 845,998.

*To all whom it may concern:*

Be it known that I, WIRT TASSIN, a citizen of the United States, residing at Washington, in the District of Columbia, have invented certain new and useful Improvements in Primary Cells, of which the following is a specification.

This invention relates to primary cells; and it comprises a compact and economical cell of long life and high efficiency and comprising a mechanically strong annular electrode of cupriferous depolarizing material, which in addition to its electrical functions serves also for giving mechanical strength to the cell as a whole, and also comprising a substantially centrally arranged positive electrode of zinc, cadmium, magnesium or the like of a special skeleton or slatted form; said cell also comprising certain new and advantageous details of construction of the cell walls and top and bottom sections; all as more fully hereinafter set forth and as claimed.

In the current art there are a number of types of primary cell wherein copper oxid (which is always the black or cupric oxid) is used as a depolarizer. Sometimes the cupric oxid is used as a loose granular body of copper scale or the like; and sometimes it is cemented or otherwise aggregated into shaped bodies. The electrolyte is usually alkaline. None of these copper oxid cells however is of a mechanically strong construction. Rough usage, such as the shaking or jarring incidental to the use of such cells in automobiles, motorboats and the like, results in damage to the electrodes, destruction of the cells and short circuiting.

It is an object of the present invention to produce a primary cell in which the constituent active parts are so proportioned that it affords the maximum strength and durability with the minimum size and weight consistent with a given output; giving a cell which is of relatively long life and which gives a relatively constant output till certain of the active constituents are consumed and in which the full discharge rate is reached immediately on putting into action. The present cell is designed for use in any place where it may be subjected to rough usage as shaking or jarring, as in automobiles, motorboats and the like and is intended to meet the requirements of motor, internal combustion or other engine wherein electricity is resorted to for the ignition of the power generating vapor or gas; by the provision of a cell the parts of which are durable, simple in construction and permit of a quick and cheap assembly, In producing the present cell in lieu of using the ordinary copper oxid electrodes or depolarizers I advantageously use a special cupriferous material for my negative electrode. I have found that a composition containing both cuprous and cupric oxids, with the former in excess and advantageously in large excess, possesses a number of electrical advantages; giving the cell in which it is used a long life and an unusually uniform rate of discharge. In another application Serial Number 843,495, I have described and claimed negative electrodes composed of this material. Advantageously, the ratio of cuprous oxid to cupric oxid is about 2:1. While electrodes of this material may be made by directly mixing the two oxids in the desired proportions, I have found that it is better to produce them in a state of intimate admixture or, and very likely, in a state of combination, by heating black copper oxid at such a high temperature that oxygen is freely evolved. In so heating a portion of the CuO becomes $Cu_2O$ while a portion remains as CuO. At a temperature at which the oxid fuses or sinters, an equilibrium or balance is established between the cuprous oxid produced by evolution of oxygen and residual cupric oxid in which there is the approximate ratio of $Cu_2O:CuO=2:1$. A cheap and advantageous method of producing such material is to take ordinary crude copper sulfate, heat it until the sulfuric acid is substantially expelled and oxid of copper left, grind, magnetically separate any contained iron (iron is undesirable in the electrode material) and then bring the purified oxid to the fusing or sinistering temperature, maintaining it at this temperature until free evolution of oxygen substantially ceases. In so fusing or sintering, the material becomes, mechanically considered, strong and resistant. In the present invention therefore I take black copper oxid and place it in a mold, which may be of iron or other suitable material, and heat until the free evolution of oxygen ceases and the described approximate ratio of $Cu_2O$ to $CuO$ of 2:1 is obtained. At this point, the material becomes an open textured aggregate. The mold is so shaped as to produce an annulus of the size desired for the cell wall. Before this sintering and oxygen liberating operation I ordinarily embed in the oxid of copper a copper wire which is to serve ultimately as a terminal. Advantageously this wire is crimped or otherwise shaped to give it a large area of contact with the oxid.

The hollow body of cupro-cupric oxid thus obtained may be directly employed as a container for the cell, it merely needing waterproofing on the exterior surface for this purpose. It may be so waterproofed by a coating of paint, varnish, etc. But it is advantageous to use it in connection with a carton of paper, paperboard or the like. In assembling the cell the negative electrode made as described may be simply slipped into the carton.

In the accompanying drawing I have shown, more or less diagrammatically a cell under the present invention.

In this showing Figure 1 is a vertical section of the complete cell with the cathode shown in elevation; Fig. 2 is a detail view of a hanger or carrying frame forming part of the cathode; and Fig. 3 is a plan view of a paper separator used in constructing the cell.

Referring to the drawings, element 1 designates a paper carton having the turned-up portion 2 to serve as a foot and maintain the cell normally spaced from the ground or receptacle in which it is resting. Secured against this turned-up portion is bottom 3. When the cell is of cylindrical formation this bottom is disk-shaped and has a raised periphery or annular rim 4 to give rigidity and strength. The carton and its bottom may be made of any material but I ordinarily employ paraffined paper or vulcanized fiber. In the upper part of the carton is located a waxed or paraffined paper separator partition 5 which is used in supporting the positive electrode and also serves to form a liquid tight and air tight seal. It is sealed to and rests upon the negative electrode. The walls of the carton extend above the partition and carry top 6, crimped over at 7. Within the carton is annular negative electrode 8, of the stated cupro-cupric oxid material. A copper wire or other conductor 9 is embedded therein. The upper portion 10 of this conductor is arranged in such position that in assembling it may pass through the holes in the partition and the top. It is secured in position by lock-nut 11. This assists in holding the top in place. The annular negative electrode 8 practically constitutes the wall of the cell. The outer side of this electrode may if desired be coated with paraffin, waterproof paint or the like in order that the electrolyte may not seep through it, but when located in a carton, as shown, this is not necessary. As shown, it rests with its bottom edge on the annular rim (4) of the bottom of the carton. While other types of positive electrode or pole may be used, I find it particularly advantageous in producing the present compact and efficient form of cell to use the one shown in the drawing. As shown, this electrode is composed (see Fig. 2) of a zinc hanger which has depending portions 13 provided with turned over or hook portions 14. As shown, there are two sets of these hanger arms arranged at right angles to each other and electrically welded together. Welding is preferable to soldering. In so welding, a paste of comminuted zinc may be used between the parts to be united; this zinc acting as an autogenous solder. Supporting terminal and conductor rod 15 of copper passes through the top or saddle of the two hangers terminating in head 16, which may be tinned. This terminal may advantageously be in position prior to the electric welding and be electrically welded to the zinc. Around the skeleton frame formed by these hangers I wind a strip of zinc 17 to form an open spiral. This structure affords free fluid communication between the interior of the positive electrode and the surrounding electrolyte. This spiral zinc strip may, and advantageously is, welded to the hangers.

In assembling the elements heretofore described, the negative electrode is slipped into the carton or wrapper, and the paper separator (5) is placed over the terminal of the positive electrode described. On this separator and over the conductor is placed fiber washer 18. Advantageously this washer is threaded, making it really a nut, and is screwed down on the conductor to lock the separator in place. The separator and the positive electrode are now placed in position after putting the electrolyte in the cell. In thus assembling, hole or slot 19 (see Fig. 3) of the separator goes over the terminal of the negative electrode. The space above the separator is now filled with a suitable absorbent 20, such as bibulous paper scraps, corn pith, kieselguhr, etc. Bibulous or blotting paper is however very satisfactory. Wax, rosin, etc., may be cast into the space above the separator. The top is now placed in position and lock-nuts 11 and 21 screwed down on the terminals of the respective electrodes.

The electrolyte employed may be any caustic alkali solution, such as soda or potash. It may be thickened by any of the usual materials to give a pulpy or pasty electrolyte when it is desired to use the described cell as a dry cell.

The carton may be waterproofed by any of the usual varnishing and waterproofing compositions. The top and the separator may be similarly treated. The separator partition 5 may be of any heavy impregnated paper or fiber materials. It is punched as shown in Fig. 3 for convenience in assemblage. After assemblage with the carton and the electrodes it may be sealed fast to the interior of the carton by wax or other suitable sealing means. So employed and in connection with the fiber washer 18, it forms a liquid tight seal for the top of the cell. In assembling, a little parafin or wax may be poured in. This seals the surface, seals around the fiber washer and closes the top of slot 19 which fits closely to the conductor.

The structure shown is one that affords great stiffness and resistance to suddenly applied shock or jars. The prolongation or offset at the top and bottom of the carton give an increased resistance to vertically applied stresses and affords protection to the terminals of the electrode. With the particular form of positive electrode shown which though described as being of zinc may be of magnesium or cadmium or alloys of any of these metals, there is a substantially constant ratio of surface of the electrode in use, which insures a substantially complete consumption of the zinc at the time of exhaustion of the cell. The electrode terminates some distance from the bottom of the cell thus preventing the formation of trees and inhibiting short circuiting. With the spiral design a maximum zinc area is exposed to the action of the electrolyte; and in this form the upper portion of the element of the electrode does not dissolve unequally. Practically all parts of the zinc electrode are practically at the same distance from the inner wall of the negative electrode, and the skeleton form gives a higher efficiency than is possible with the ordinary form of primary cell having a relatively small solid centrally disposed zinc rod. The autogenous welding of the zinc electrode obviates the opportunity for local action afforded by use of solder.

The separator partition shown is of an unusually advantageous type. It is sealed to and rests upon the negative electrode and is also sealed to the paper carton or wrapper by the waxy material used as described. The separator (5) acts as a support and guide for the zinc element, serving to hold it centrally in the cell. It prevents splashing of the liquid electrolyte, where such is used, and consequent short circuiting. It is more advantageous than the use of oil which is common for this purpose. Oil has the disadvantage that it may be absorbed by the negative element and oily impregnation of any portion of the electrode renders such portion no longer electrically active. It also acts as a seal against the entrance of external air or gases and obviates the lowering of the efficiency of the liquid alkaline electrolyte resulting from the formation of carbonates. While the space above the separator and the top proper may be filled with wax, asphalt, pitch, etc., I find the use of absorbent paper, such as teazled blotting paper, is particularly advantageous under certain conditions. It is lighter than wax or pitch and serves equally well to obviate short circuiting. Should any small amount of moisture gain access, it is simply taken up by the paper. Corn pith may also be used. The fiber washer serves as a lock-nut to secure the zinc element to the separator, and insulates the terminal of the zinc element in the space between the separator and the top, offering an additional preventive against short circuiting. It further operates as a spacing element between the cover and the separator and as a seat for the lock-nut of the zinc element and the cover. Instead of forming the negative electrode by fusing or sintering copper oxid in a mold in the manner described, the fused or sintered material may be reground, mixed with molasses or other material giving a binder on firing, molded into shape and then baked. But I regard the described method of sintering and forming simultaneously as the best since it gives a stronger product.

What I claim is:—

1. In a primary cell, a hollow body of mechanically strong cuprocupric oxid serving as negative electrode and cell wall, external means sealing the outer surface of said body against passage of fluid, an electrolyte within the vessel thus formed and a centrally hung positive electrode.

2. In a primary cell, a hollow body of mechanically strong cuprocupric oxid serving as negative electrode and cell wall, a carton fitting against the outer surface of said body to seal it against passage of fluid, an electrolyte within the vessel thus formed and a centrally hung positive electrode.

3. A primary cell comprising a hollow body of cuprocupric oxid serving as negative electrode and cell wall, a carton fitting the external surface of said body and having a bottom serving as the cell bottom, an electrolyte in the cell thus formed, a centrally located positive electrode, an upper transverse partition of fibrous material resting on the top of the hollow body and sealing means above said partition.

4. In a primary cell, a paper carton having a bottom with a raised peripheral rib, a hollow body of cuprocupric oxid resting on said rib and fitting against the inner side of said carton, a centrally located suspended positive electrode, a transverse partition resting on the top of said positive electrode and sealing means above said partition.

5. In a primary cell, a positive electrode composed of a plurality of zinc strips in open cage-like arrangement.

6. In a primary cell, a positive electrode composed of a plurality of depending hanger strips and a metal strip wound therearound in an open spiral.

7. In a primary cell, a positive electrode composed of a plurality of depending hanger strips and a metal strip wound therearound in an open spiral, said spiral and strips being well-united.

8. A primary cell composed of a hollow body of cuprocupric oxid, an inclosing carton, a contained body of electrolyte, a centrally located positive electrode composed of zinc strips in open arrangement and sealing means for the top of the cell.

9. In a primary cell, a carton, a hollow negative electrode fitting against the carton walls, a contained body of electrolyte, a centrally positioned positive electrode, a transverse separator partition resting on the top of the negative electrode and supporting the positive electrode, said separator being positioned somewhat below the top of the carton walls, means for sealing said separator in position liquid tight and a cover spaced above the separator.

10. In a primary cell, a carton, a hollow negative electrode fitting against the carton walls, a contained body of electrolyte, a centrally positioned positive electrode, a transverse separator partition resting on the top of the negative electrode and supporting the positive electrode, said separator being positioned somewhat below the top of the carton walls, means for sealing said separator in position liquid tight, a cover spaced above the separator and absorbent material between the cover and separator.

In testimony whereof, I affix my signature in the presence of two subscribing witnesses.

WIRT TASSIN.

Witnesses:
K. P. McELROY,
JOHN H. SIGGERS.